US012745159B2

(12) United States Patent
Jia et al.

(10) Patent No.: US 12,745,159 B2
(45) Date of Patent: Sep. 22, 2026

(54) MANAGEMENT OF MOBILE COMMUNICATIONS DEVICES PROXIMATE AIRCRAFT

(71) Applicant: AT&T Intellectual Property I, L.P., Atlanta, GA (US)

(72) Inventors: Yupeng Jia, Austin, TX (US); Michael Prise, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 548 days.

(21) Appl. No.: 17/804,103

(22) Filed: May 26, 2022

(65) Prior Publication Data

US 2023/0388899 A1 Nov. 30, 2023

(51) Int. Cl.

| | |
|---|---|
| ***H04W 48/04*** | (2009.01) |
| ***H04L 5/00*** | (2006.01) |
| ***H04W 4/30*** | (2018.01) |
| *H04W 84/06* | (2009.01) |

(52) U.S. Cl.

CPC ........... *H04W 48/04* (2013.01); *H04L 5/0098* (2013.01); *H04W 4/30* (2018.02); *H04W 84/06* (2013.01)

(58) Field of Classification Search

CPC ....... H04W 48/04; H04W 4/30; H04W 84/06; H04L 5/0098

USPC .......................................................... 370/329

See application file for complete search history.

(56) References Cited

U.S. PATENT DOCUMENTS

| | | | | |
|---|---|---|---|---|
| 7,187,927 | B1 * | 3/2007 | Mitchell | H04B 7/18508 455/431 |
| 8,245,066 | B1 * | 8/2012 | Sharkey | G06F 9/4401 713/324 |
| 9,277,355 | B1 * | 3/2016 | Rosenbach | H04W 4/027 |
| 10,037,508 | B1 * | 7/2018 | Rusnak | H04W 4/80 |
| 2006/0270470 | A1 * | 11/2006 | de La Chapelle | B64D 45/0059 455/575.5 |
| 2007/0042765 | A1 * | 2/2007 | Bailin | H04W 48/04 455/418 |
| 2007/0264999 | A1 * | 11/2007 | Radpour | H04M 3/42229 455/431 |
| 2008/0115007 | A1 * | 5/2008 | Jalali | H04B 7/18508 714/1 |

(Continued)

*Primary Examiner* — Thuong Nguyen

(74) *Attorney, Agent, or Firm* — Guntin & Gust, PLC; John G. Rauch

(57) ABSTRACT

The disclosed technology is directed towards disabling mobile device communications when such communications can possibly interfere with aircraft equipment. Examples include disabling the C-Band communications of devices when proximate an aircraft and/or airport. A signal beacon can be sent to devices, and as one example, devices capable of C-Band communications can be configured to automatically disable this frequency band. Devices that cannot react to this signal can disable frequency band(s)/switch to airplane mode in other ways, including based on received notifications, or based on sensed condition data. For example, motion detection, possibly combined with location data and/or elevation data, can determine whether a device is aboard an aircraft that is taxiing, preparing for takeoff, taking off, preparing for landing or landing. Elevation data can detect when a device is below some defined ceiling elevation, to take action with respect to disabling one or more predetermined frequency bands.

20 Claims, 10 Drawing Sheets

(56) References Cited

U.S. PATENT DOCUMENTS

| | | | | |
|---|---|---|---|---|
| 2008/0266166 | A1* | 10/2008 | Schuchman | G08G 5/727 342/37 |
| 2009/0186611 | A1* | 7/2009 | Stiles | H04B 7/18506 455/431 |
| 2009/0310529 | A1* | 12/2009 | Muller | H04B 7/18506 370/316 |
| 2009/0310580 | A1* | 12/2009 | Chapman | H01Q 1/245 455/431 |
| 2009/0322589 | A1* | 12/2009 | Dooley | G01S 13/765 342/37 |
| 2013/0324070 | A1* | 12/2013 | Bennett | H04W 84/005 455/431 |
| 2015/0318913 | A1* | 11/2015 | Lauer | H04W 40/02 455/431 |
| 2016/0127060 | A1* | 5/2016 | Cross | H04W 52/52 375/211 |
| 2016/0380719 | A1* | 12/2016 | Bassow | H04K 3/86 455/1 |
| 2017/0006149 | A1* | 1/2017 | Namgoong | H04M 1/72412 |
| 2017/0150387 | A1* | 5/2017 | Fujishiro | H04W 72/54 |
| 2017/0163794 | A1* | 6/2017 | Liu | H04M 1/72457 |
| 2017/0238281 | A1* | 8/2017 | Takano | H04W 84/12 370/312 |
| 2017/0295069 | A1* | 10/2017 | Sweet, III | H04B 7/18504 |
| 2018/0020376 | A1* | 1/2018 | Belghoul | H04W 28/0861 |
| 2018/0372833 | A1* | 12/2018 | Wen | G01S 19/17 |
| 2020/0145031 | A1* | 5/2020 | Karlsson | G01S 19/13 |
| 2020/0288284 | A1* | 9/2020 | Klein | H04W 12/63 |
| 2021/0105101 | A1* | 4/2021 | Wei | H04L 5/0032 |
| 2022/0312152 | A1* | 9/2022 | Sundström | H04M 1/72463 |
| 2023/0199602 | A1* | 6/2023 | Li | H04W 36/0069 370/331 |
| 2023/0388899 | A1* | 11/2023 | Jia | H04L 5/0098 |

* cited by examiner

MOBILE HANDSET

APPLICATIONS 906

CLIENT (STORE, DISCOVERY, PLAY) 946

TRIGGER COMPONENT 938

HYSTERESIS COMPONENT 936

SIP CLIENT 940

FIRMWARE 908

VIDEO COMP 930

DISPLAY 912

CAMERA 922

SERIAL I/O INTERFACE 914

USER INPUT 935

SUBSCRIBER IDENTITY SYSTEM 918 920

COMMUNICATION COMPONENT 910

CELL TCVR 911

WIFI TCVR 913

PROCESSOR 902

MEMORY 904

LOCATION COMPONENT 932

AUDIO I/O 916

POWER SOURCE 924

POWER I/O 926

MANAGEMENT OF MOBILE COMMUNICATIONS DEVICES PROXIMATE AIRCRAFT

TECHNICAL FIELD

The subject application relates to mobile communications devices in general, and more particularly to the management of frequency band communications of mobile devices proximate (within or near) aircraft, and related embodiments.

BACKGROUND

In the United States, the Federal Communications Commission and Federal Aviation Administration are still researching and adding to their understanding of how the new deployment of 5G C-Band (which ranges from 3.7 GHz to 3.98 GHz in the United States) services could impact the performance of fixed and rotary-wing aircraft radio altimeters (4.2-4.4 GHz). Their studies are focused on preventing signals from 5G C-Band towers that might cause performance issues for aircraft radio altimeters, especially during approaches and landings in low visibility at airports located sufficiently close to the towers. In addition to the ongoing interference studies between network nodes and aircraft radio altimeters, there are also studies regarding the impact of handheld devices that support C-Band communications while on a flight.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
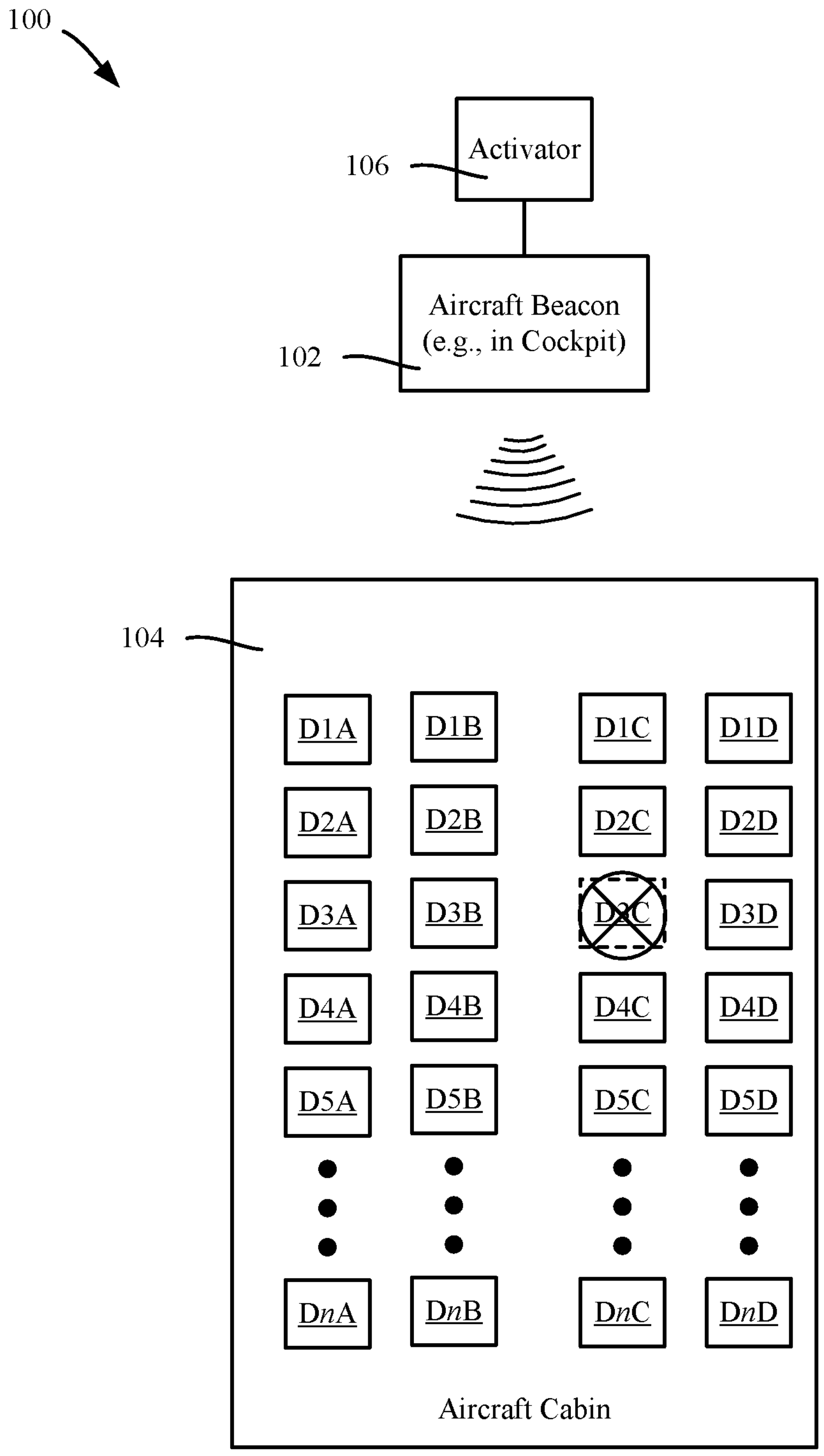
FIG. 1 is a block diagram of an example system incorporated into an aircraft for disabling frequency band(s) with respect to mobile device communications, in accordance with various aspects and embodiments of the subject disclosure.

The technology described herein is generally directed towards disabling one or more frequency bands (e.g., the C-Band, which ranges from 3.7 GHz to 3.98 GHz in the United States) on mobile communications devices in proximity to (that is, near or within the inside of) an aircraft. In one implementation, a wireless signal beacon transmits signaling data that, when received by a mobile communications device, results in the device disabling (that is, muting or otherwise turning off) the frequency band(s), which can be automatically entering an airplane mode of operation. In another implementation, a mobile device can sense conditions (e.g., including via motion detection) indicating that the aircraft is taking off, taxiing, landing and so on, and in response, disabling the defined frequency band(s). A mobile device can send a signal to neighboring devices to mute their frequency band(s) through device-to-device communications. Further, a mobile device or a device aboard the aircraft or in the airport can send signaling data to a network node (e.g., to a 5G gNB) when detecting frequency band (e.g., C-Band) cellular signals inside or close to the airport, whereby the network node can mute the frequency band beam towards the airport, or lower the signal level.

As used in this disclosure, in some embodiments, the terms “component,” “system” and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a general system 100 in which an aircraft beacon 102, e.g., located in the cockpit or other portion of the aircraft, outputs a signal that disables at least one frequency band on which mobile devices D1A-Dn, e.g., of passengers in the aircraft cabin 104 and other areas, can communicate. This can be, or can include, the C-Band, for example.

As shown in FIG. 1, an activator 106 can trigger the aircraft beacon 102 to output the signal(s), such as manually, periodically, in response to an event such as the pilot initiating a takeoff or landing procedure on an aircraft computer, and so on. Another example is that the activator 106 can be configured to trigger the aircraft beacon 102 based on GPS coordinates or the like that indicate that the aircraft is within X distance of an airport. The signals can be sent via one or more of Wi-Fi, BLUETOOTH, cellular frequencies and so on.

In any event, at least one mobile device communications frequency band, such as the C-Band is disabled when in proximity to (including just outside or inside the aircraft) via wireless signal beacon 106 when activated. Disabling can include completely muting the mobile device communications frequency band(s) or significantly reducing the power output on the frequency band(s) so as to effectively disable the frequency band(s). A mobile device can be initially constructed with this capability, or existing devices that use the frequency band(s) can have their firmware and/or operating system upgraded to have this capability, and so on. A device's location can be sensed by a mobile network and used to selectively activate or deactivate frequency band communications of the device based on location, e.g., when near or within the confines of an airport.

In the example of FIG. 1, consider that the mobile device D3C is unable to receive the signal(s) from the aircraft beacon 102, such as if shut off, or in an airplane mode of operation in which no communications, including Wi-Fi, GPS, BLUETOOTH, cellular or other communications are receivable, e.g., as indicated by the crossed-"X" over and the dashed box representing the device D3C in this state. As such, if the user changes the device state, such as turns it on or exits airplane mode (e.g., FIG. 2), the mobile device D3C has not necessarily received the aircraft beacon's output signal, including between retransmission periods (if periodic) or otherwise if not transmitted continuously or is retransmitted but at a low rate, if at all. If limited communications are allowed, such as communications other than via the C-Band, an alternative is to not allow a properly configured device to turn the C-Band on for a time period that is known to be longer (e.g., one minute) than the time in which the beacon 102 retransmits the beacon (e.g., every 30 seconds). In this way, the device will never turn on C-Band communications if aboard an aircraft during a C-Band disabling situation in which the beacon is output sufficiently often.

Figure 2:
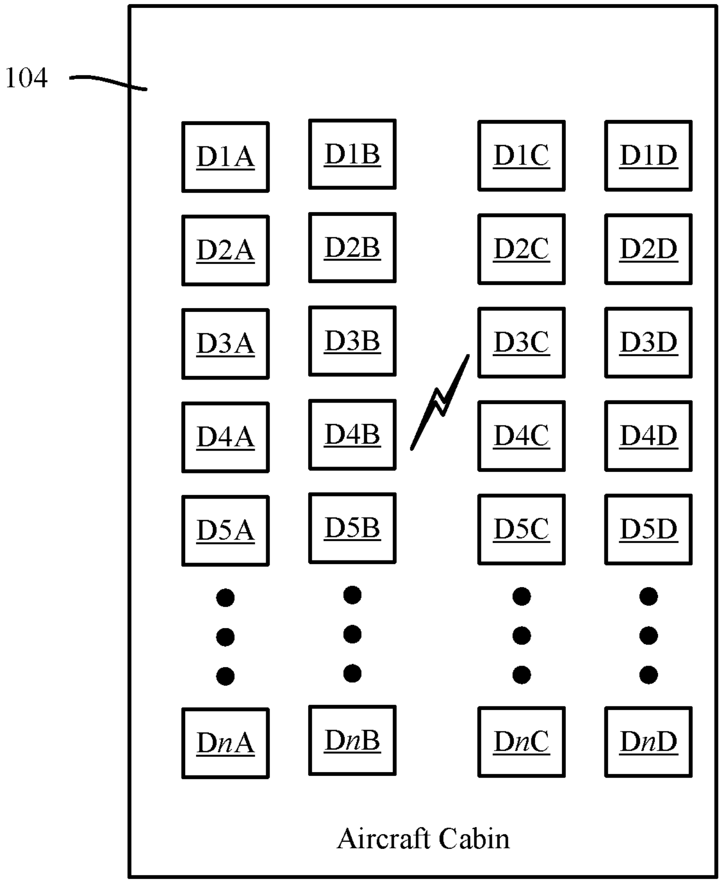
FIG. 2 is a block diagram of an example system in which one mobile device can signal another mobile device to disable frequency band(s) with respect to mobile device communications, in accordance with various aspects and embodiments of the subject disclosure.

In the example of FIG. 2, consider that another device such as the device D4B which is not fully unable to communicate is configured to re-output a disabling signal. For example, if only C-Band communications are to be turned off on devices, Wi-Fi, BLUETOOTH or non-C-Band cellular communications can relay the information to the mobile device D3C, and thereby disable that device's C-Band communications. Any other of the mobile device or devices can be configured to re-output such a disabling signal, e.g., by sending a signal to neighboring devices to disable C-Band communications through device-to-device communications, such as at random or pseudo-random times.

As described herein, a mobile device can also be configured to disable C-Band or other frequency bands/radio technologies while taking off or taxing or landing through motion detection or other sensing performed on that device. An example of other sensing can include audio detection e.g., "please prepare for takeoff," "please prepare for landing" and so on.

Figure 3:
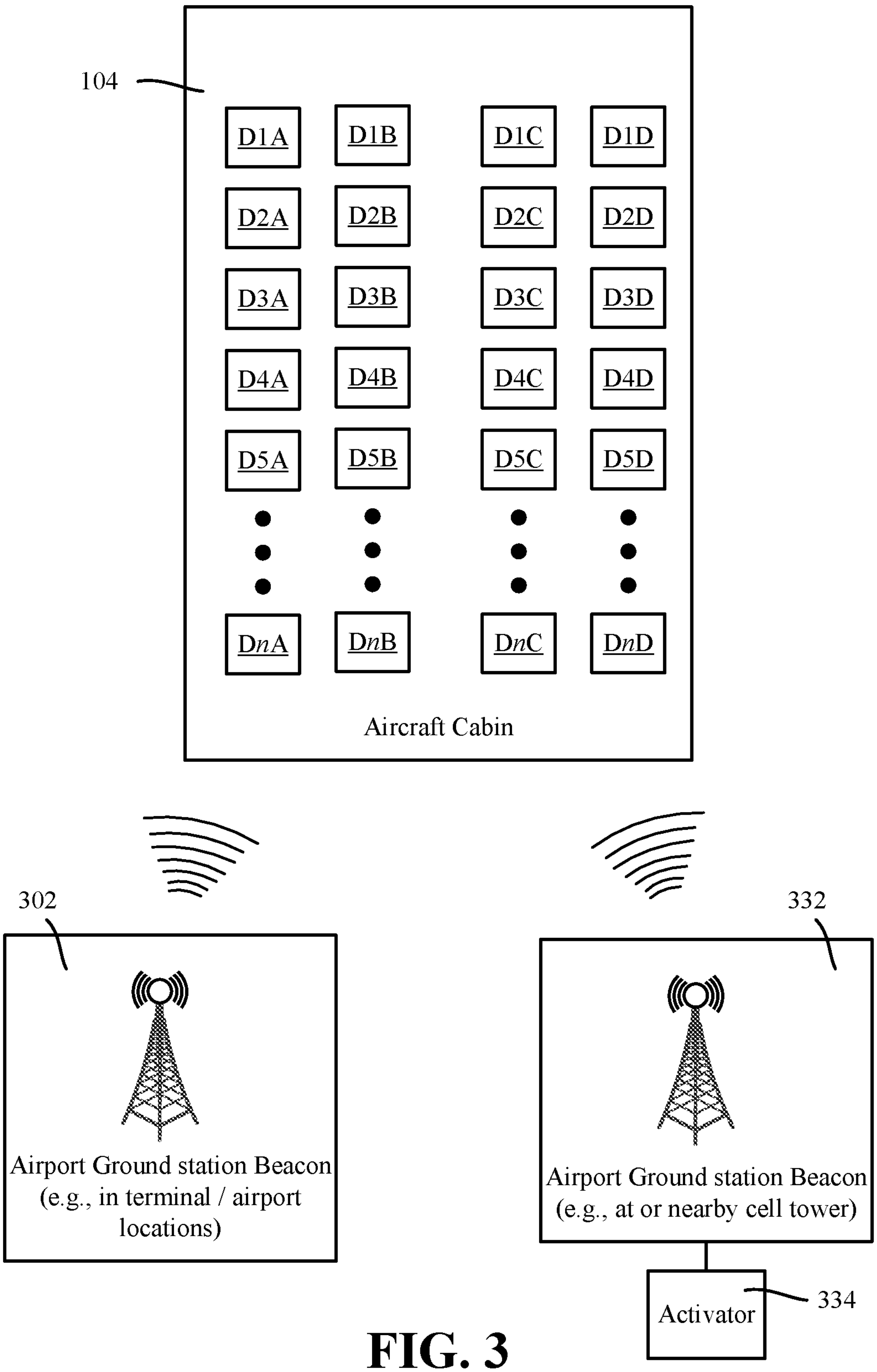
FIG. 3 is a block diagram of an example system incorporated into an airport transmitter for disabling frequency band(s) with respect to mobile device communications, in accordance with various aspects and embodiments of the subject disclosure.

Turning to another example, consider that as shown in FIG. 3, an airport ground station beacon 302, such as in or next to the terminal, and/or distributed around the runways and so forth can output the disabling signal. In this way, if a given aircraft is not configured with such a beacon, mobile devices aboard aircraft and/or within or the airport are deactivated with respect to communication via certain frequency band(s). Note that this likely would not include all cellular communications, only those in select band(s) that may possible cause an interference issue with airport/aircraft operations.

As also shown in FIG. 3, consider that an airport beacon or other disabling technology is implemented at a cell tower nearby the airport. An activator 334 can selectively operate the beacon 332, such as for activating the beacon signal when a plane is approaching (known from other data). A sparsely utilized airport, at least one that is not often utilized at certain times, can benefit from selectively activating and deactivating the beacon 332.

Another disabling technology can be built into the network node. For example, consider that a C-Band cellular signal is detected inside or close to the airport. When this occurs, a signal can be sent to a 5G gNB (or more than one), whereby the network node can mute the C-Band beam(s) towards the airport or lower the signal level. This will result in the network handing off the communication to a different, allowed frequency band (or bands).

It should be noted that only authorized persons/beacons/network nodes or the like may be configured to have the ability to disable one or more frequency bands for device communications. For example, it may be possible to force a mobile device into an airplane mode, but doing so could allow unscrupulous persons to do so for whatever reason via a homemade or otherwise prohibited device. Thus, some security technology such as authentication, coded signals and so on may be used to prevent such an attack.

Figure 4:
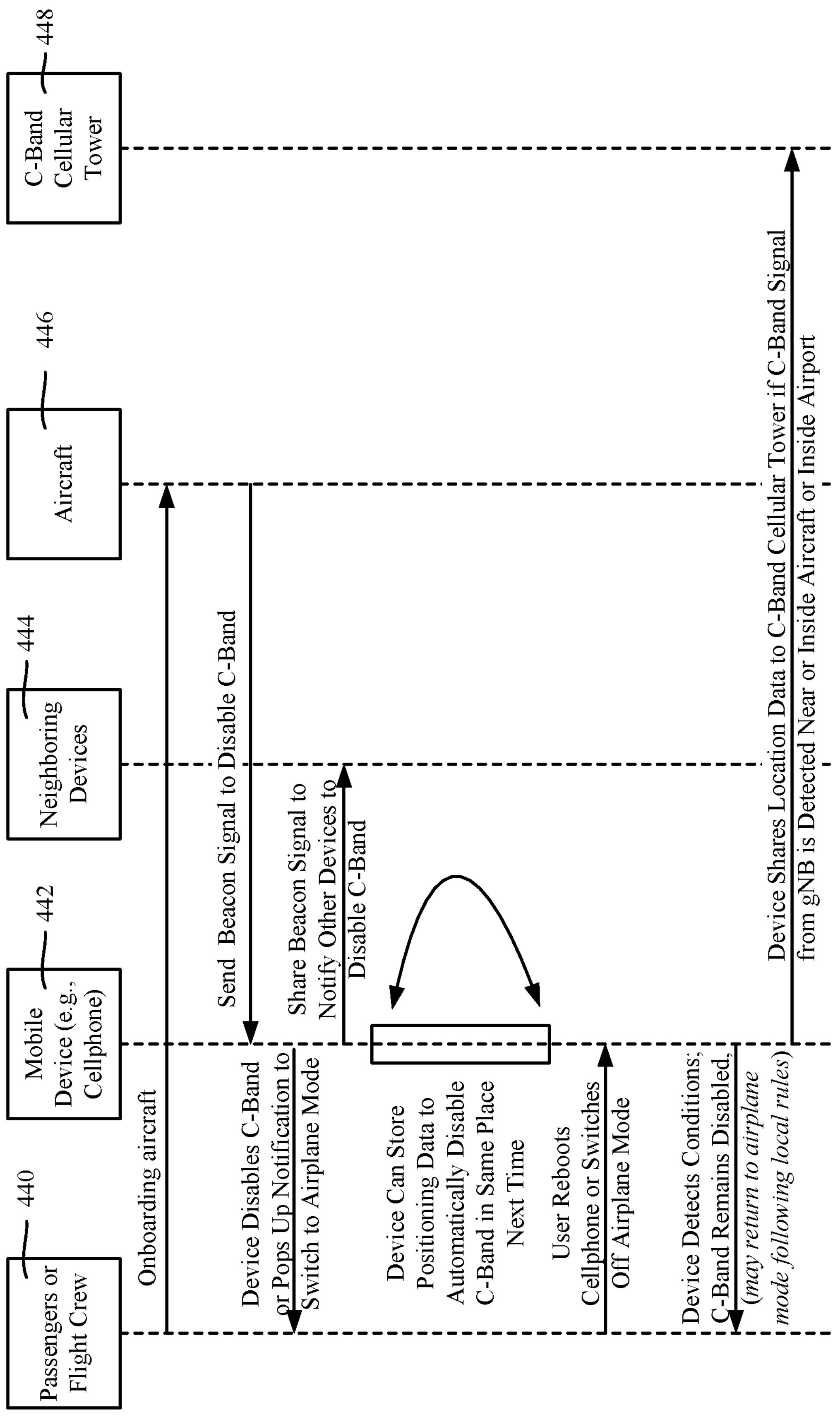
FIG. 4 is a sequence diagram showing example operations/dataflow among various system components to disable a frequency band with respect to mobile device communications, in accordance with various aspects and embodiments of the subject disclosure.

FIG. 4 shows a sequence diagram of some of the dataflow/operations of various entities that can act to disable mobile communications, which in this example is based on disabling C-Band communications. In this example, the passengers or flight crew (block 442) carry at least one mobile device 442 (e.g., a cellphone) and neighboring devices 444 onboard and aircraft 446. At least one C-Band-capable cellular tower 448 is within range of the devices 442 and 446.

Following onboarding of the aircraft 446, at some point the aircraft beacon (e.g., 102, FIG. 1, if present) sends a beacon signal to disable the device 442 (and any of appropriately configured neighboring devices 446, not explicitly shown) with respect to C-Band communications. A beacon signal can also be sent via a device positioned within the airport, such as by each gate, near each runway, and so forth.

As set forth above, the signal may be send on-demand (e.g., during flight preparations, when taxiing for takeoff, upon lowering the flaps, when accelerating for takeoff, and/or the like), periodic, or on some other schedule. Further, if a given device cannot by itself automatically disable the C-Band, a pop-up notification can be sent to the user to switch the device into the airplane mode of operation. It also may be feasible to force the device into the airplane mode if the device is properly configured.

A device such as the device 442 can share the beacon signal or a like signal (e.g., via a different connection, e.g., receive via cellular, repeat via Wi-Fi). As another example, a user with an otherwise active cellphone can switch on a different device such as a laptop or tablet computer and receive the disabling signal via BLUETOOTH when paired with the cellphone.

Further, a device such as the device 442 can be configured to store positioning data to automatically disable the C-Band whenever returning to the same location, e.g., within some range thereof such as Y meters. Storing the positioning data can be particularly useful for devices that are unable to automatically disable the C-Band in response to the beacon. For example, if the user sees a popup notification and manually disables the C-Band (e.g., enters airplane mode) in response to the notification, the next time when within range of the stored position data, the device can automatically enter the airplane mode based on the current location being close to the location corresponding to the stored position data, even if the user misses the popup notification next time.

Another possible way to disable the C-Band is when the C-Band is not disabled, such as because the device 442 is powered off or was already in airplane mode when the beacon signal was sent. In such a state, the user can reboot the device 442 or switch off airplane mode. When reactivated in this manner, the device 442 can be configured to sense conditions and determine actions based thereon, such as to detect motion (e.g., the aircraft taxiing, decelerating for landing or accelerating for takeoff) or possibly sense other data, such as by the device hearing and recognizing an announcement by the flight crew as in the above examples. Elevation and/or location data (e.g., descending and approaching an airport) are also possible sources of information that can be used. In such a reactivated state, the C-Band remains disabled, or the device is kept on airplane mode or returned to airplane mode following local aviation rules.

Flight scheduling/calendar/timing data can also be used, e.g., to disable C-Band communications, such as corresponding to m minutes before (actual) departure and n minutes before (actual) arrival. Airplane mode can be similarly controlled automatically by such data.

A device can also share its location information to C-Band cellular tower, such as if a C-Band signal from gNB is detected proximate (near or inside aircraft) or inside airport. In this way, the network can act to disable C-Band communications until some reset criterion is met.

Figure 5:
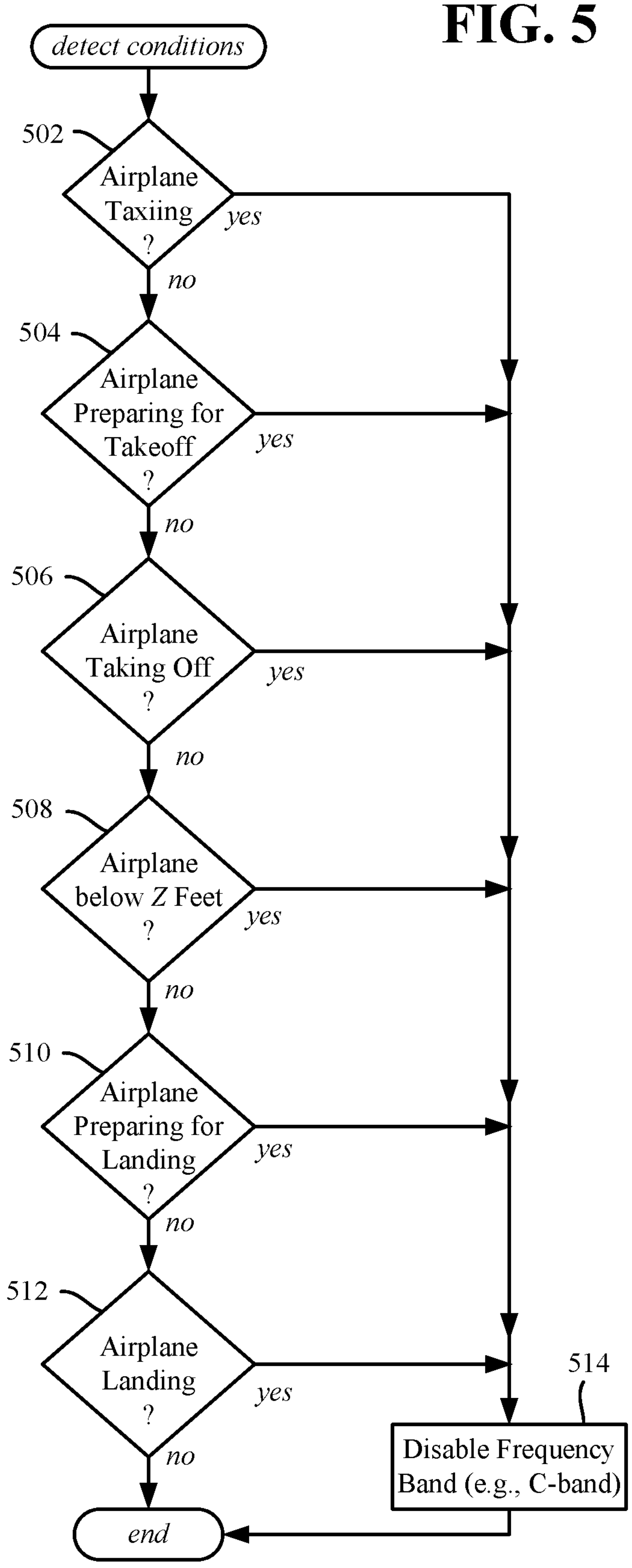
FIG. 5 is a flow diagram of example operations that a mobile device can perform to disable frequency band(s) with respect to mobile device communications, in accordance with various aspects and embodiments of the subject disclosure.

FIG. 5 is a flow diagram showing some possible, non-limiting example operations that may be performed by a mobile device aboard an airplane that detects current conditions (condition data) and analyzes the condition data to determine whether to take action with respect to disabling a frequency band(s), such as the C-Band, which can include entering airplane mode. This can be performed by a device that is not capable of automatically doing so in response to a beacon signal, or as a secondary check for devices that are capable of automatic disabling but missed the beacon signal (e.g., were powered off or in airplane mode).

Operation 502 represents motion sensing or the like and data analysis that can detect an airplane taxiing, e.g., backing out of the gate, turning and starting to move forward (possibly with multiple starts and stops). Time and location as well as scheduling data can be accessed by a device to determine that the user is (too a high likelihood) within the airport/aircraft.

Operations 504 and 506 represent respectively determining, from the condition data, that the airplane is preparing for takeoff, or is taking off (accelerating). Operation 508 represents the evaluating the some other available condition data, namely the current elevation data, to recognize that the airplane is below some elevation, e.g., Z feet, whether because of climbing or descending.

Operations 510 and 512 represent respectively determining, from the condition data, that the airplane is preparing for landing or is landing. In the example of FIG. 5, if the condition data is determined to meet the criteria set forth in any of operations 502-512, operation 514 is performed to disable the frequency band(s).

If should be noted that these and other criterion can be used to re-enable a previously disabled frequency band, so that, for example, a device is not automatically switched off once with respect to C-Band communications and not automatically switched back on (e.g., until the user remembers). For example, a user's device can detect that the user is driving or walking at a location that is far from an airport; such detection can be used to turn C-Band communications back on. Note that it is feasible to have this detection separate from airplane mode; a flight crew member can indicate that airplane mode can be exited, but doing this does not re-enable C-Band communications unless and until some other criterion/criteria is met.

Figure 6:
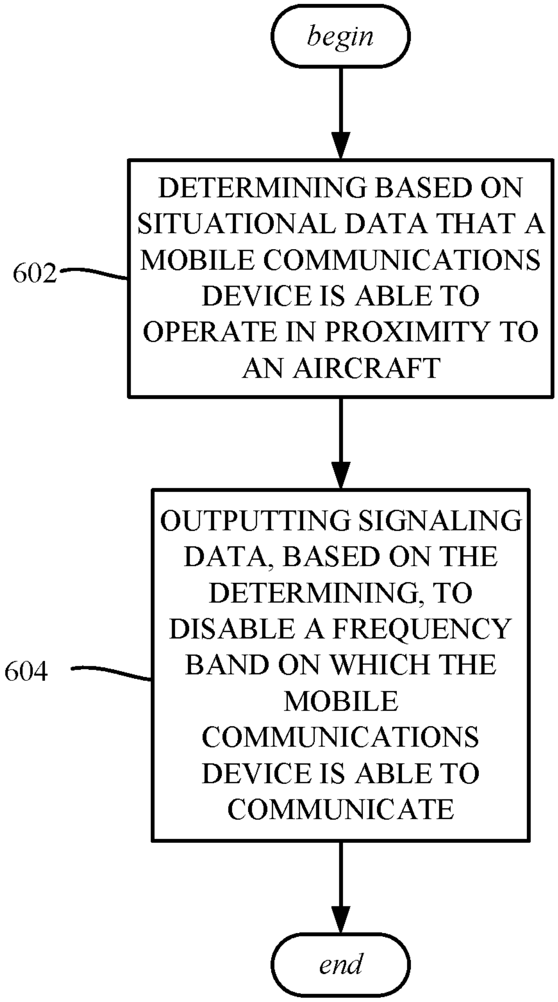
FIG. 6 is a flow diagram representing example operations related to outputting signaling data, based on situational data, to disable a frequency band on which a mobile device is able to communicate, in accordance with various aspects and embodiments of the subject disclosure.

One or more example aspects are represented in FIG. 6, and can correspond to a system, including a processor, and a memory that stores executable instructions and/or components that, when executed by the processor, facilitate performance of operations. Example operation 602 represents determining based on situational data that a mobile communications device is able to operate in proximity to an aircraft. Example operation 602 represents outputting signaling data, based on the determining, to disable a frequency band on which the mobile communications device is able to communicate.

The frequency band can include the C-band.

The situational data can indicate at least one of: that the aircraft is preparing for takeoff, that the aircraft is taxiing, that the aircraft is taking off, that the aircraft is below a defined elevation, that the aircraft is in an approach for landing, or that the aircraft is landing.

Outputting the signaling data can include transmitting a message that, in response to being received at the mobile communications device, prevents communications of the mobile communications device via the frequency band.

Outputting the signaling data can include transmitting a message that, in response to being received at the mobile communications device, causes the mobile communications device to enter into an airplane mode of operation.

Further operations can include transmitting a notification that, in response to being received at the mobile communications device, instructs, via a user interface of the mobile communications device, to take an action that disables the frequency band.

Outputting the signaling data the signal can be performed by at least one of: a wireless signal beacon coupled to the aircraft, or a wireless signal beacon of a ground station associated with an airport.

The mobile communications device can be a first mobile communications device, and outputting the signaling data can be performed by a second mobile communications device.

The signaling data can be first signaling data, and further operations can include outputting second signaling data, after the outputting the first signaling data, to disable the frequency band on which the mobile communications device is able to communicate.

Disabling can include at least one of: lowering a signal level of the frequency band or causing the frequency band to be muted by a network node.

Further operations can include causing the network node to initiate a handoff of the mobile communications device to a different frequency band other than the frequency band.

Further operations can include sensing motion indicative of the aircraft taxiing, taking off, approaching landing, or landing, and disabling the frequency band of the mobile communications device based on the sensing of the motion.

Figure 7:
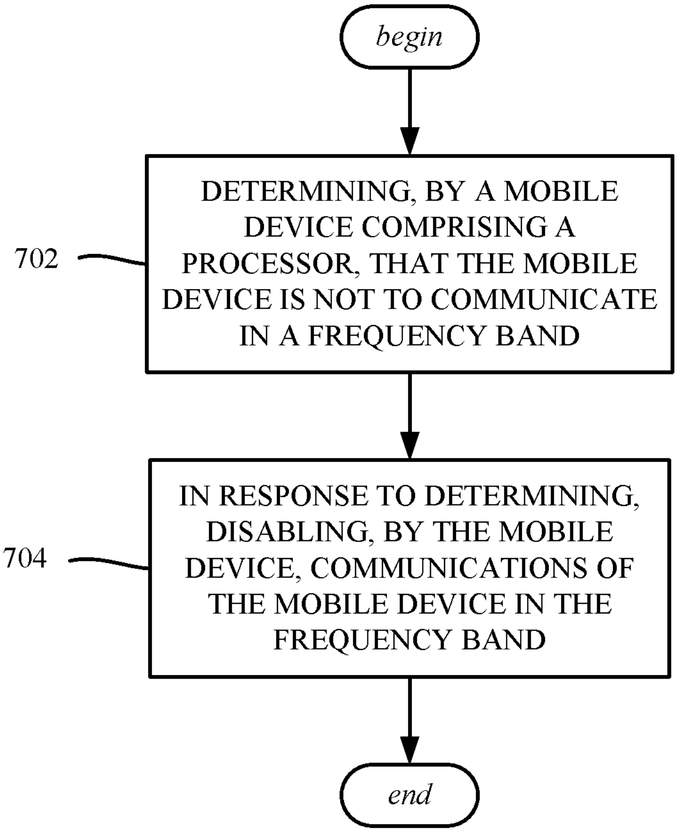
FIG. 7 is a flow diagram representing example operations related to a mobile device disabling communications of the mobile device in a frequency band in response to determining that the mobile device is not to communicate in the frequency band, in accordance with various aspects and embodiments of the subject disclosure.

One or more example aspects are represented in FIG. 7, and, for example, can correspond to operations, such as of a method. Example operation 702 represents determining, by a mobile device comprising a processor, that the mobile device is not to communicate in a frequency band. Example operation 704 represents, in response to determining, disabling, by the mobile device, communications of the mobile device in the frequency band.

Determining that the mobile device is not to communicate in the frequency band can include receiving a signal; the disabling can occur in response to receiving the signal.

Determining that the mobile device is not to communicate in the frequency band can include detecting motion indicative of the mobile device being on an aircraft; the disabling can occur in response to the detecting.

Disabling the communications of the mobile device in the frequency band can include entering the mobile device into an airplane mode of operation.

The communications of the mobile device can be first communications of a first mobile device; and further operations can include outputting a communication to a second mobile device instructing the second mobile device to disable second communications of the second mobile device in the frequency band.

Figure 8:
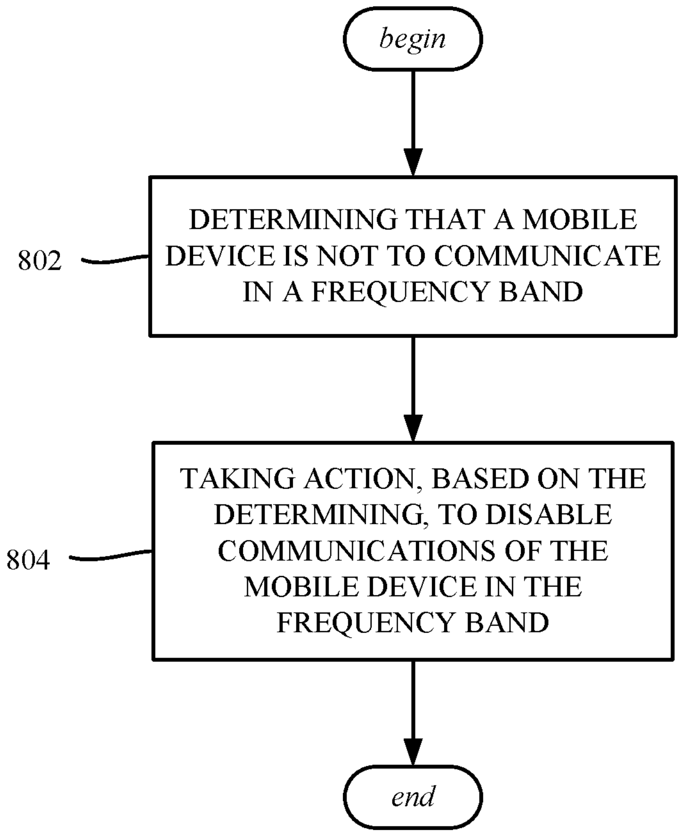
FIG. 8 is a flow diagram representing example operations related to determining that a mobile device is not to communicate in a frequency band and taking action to disable communications of the mobile device in the frequency band, in accordance with various aspects and embodiments of the subject disclosure.
Figure 9:
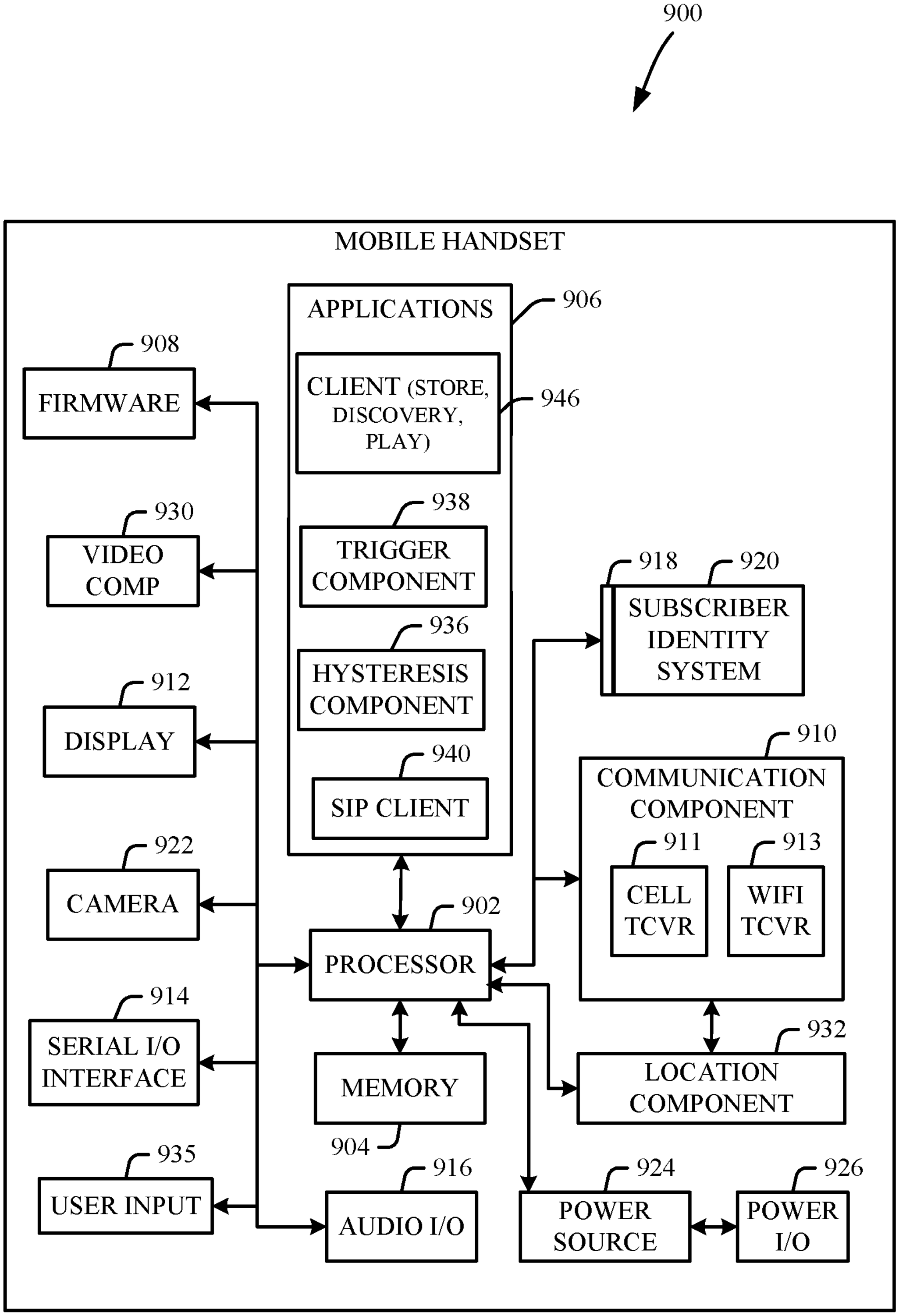
FIG. 9 illustrates an example block diagram of an example mobile handset operable to engage in a system architecture that facilitates wireless communications according to one or more embodiments described herein.

One or more aspects are represented in FIG. 8 such as implemented in a machine-readable medium, including executable instructions that, when executed by a processor of a device, facilitate performance of operations. Example operation 802 represents determining that a mobile device is not to communicate in a frequency band. Example operation 804 represents taking action, based on the determining, to disable communications of the mobile device in the frequency band.

Taking the action can include outputting a disabling signal.

Taking the action can include reducing a signal level of the frequency band at a base station via which the mobile device is capable of communicating.

As can be seen, the technology described herein facilitates switching off a frequency band (e.g., the C-Band) on handheld devices when proximate (close to or aboard) an aircraft. For example, the technology described herein can mute (zero) the C-Band to minimize any possibility of electromagnetic interference to aircraft equipment. The switching off can be based on automatically detecting the motion of the aircraft, e.g., to switch off C-Band communications or switch a device to airplane mode. This technology described herein can be applied to mute any frequency band(s), to mute frequency band(s) in other areas/situations, and/or to mute frequency bands in other radio technologies, including, but not limited to, 6G, WiFi, BLUETOOTH and so on.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) “multi-carrier system”, “multi-cell operation”, “multi-carrier operation”, “multi-carrier” transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification’s transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Referring now to FIG. 12, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE-1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
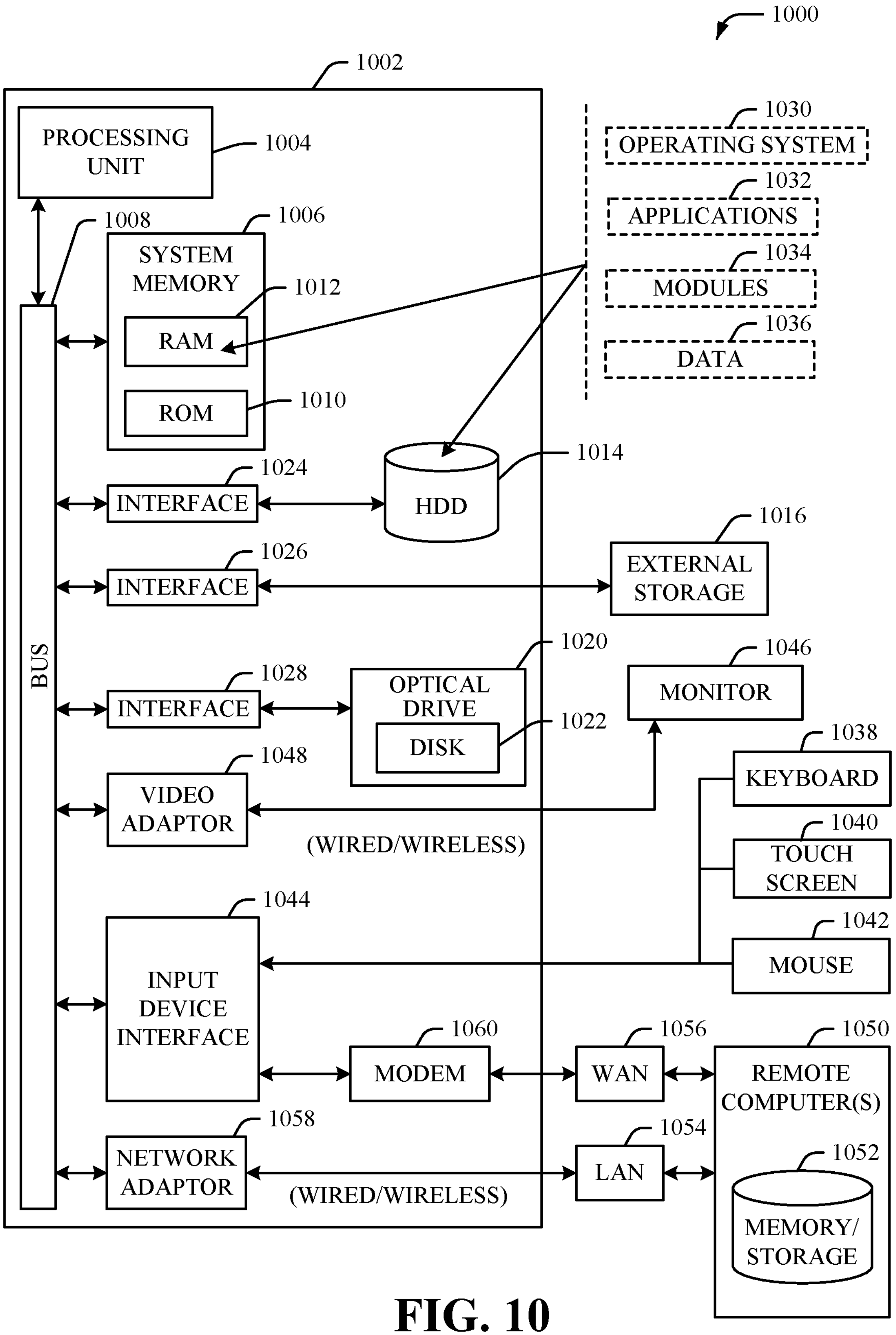
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE-1394) interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE-1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:

a processor; and a memory that stores executable instructions that, when executed by the processor of the system, facilitate performance of operations, the operations comprising:

determining based on situational data whether one or more mobile communications devices operating in proximity to an aircraft and associated with passengers on the aircraft may not operate in proximity to the aircraft; and in response to the determining, periodically transmitting an aircraft beacon at a retransmission period, wherein reception of the aircraft beacon by a receiving mobile device of the one or more mobile communication devices, disables radio communications by the receiving mobile device on a selected radio frequency band; and continuing to disable the selected radio frequency band until exceeding the retransmission period of receiving the aircraft beacon to prevent inadvertent transmission by the receiving mobile device in the selected radio frequency band, thereby creating interference by the receiving mobile device with aircraft altimeters of the aircraft.

2. The system of claim 1, wherein the selected radio frequency band comprises at least one of C-band, a non-C-band frequency band, or a range of frequency bands.

3. The system of claim 1, wherein the situational data indicates at least one of: that the aircraft is preparing for takeoff, that the aircraft is taxiing, that the aircraft is taking off, that the aircraft is below a defined elevation, that the aircraft is in an approach for landing, or that the aircraft is landing.

4. The system of claim 1, wherein the periodically transmitting the aircraft beacon comprises transmitting a message that, in response to being received at the receiving mobile device, prevents communications of the receiving mobile device via the selected radio frequency band.

5. The system of claim 1, wherein the periodically transmitting the aircraft beacon comprises transmitting a message that, in response to being received at the receiving mobile device, causes the receiving mobile device to enter into an airplane mode of operation.

6. The system of claim 1, wherein the operations further comprise transmitting a notification that, in response to being received at the receiving mobile device, instructs, via a user interface of the receiving mobile device, to take an action that disables communication on the selected radio frequency band.

7. The system of claim 1, wherein the periodically transmitting the aircraft beacon is performed by at least one of: a wireless signal beacon coupled to the aircraft, or a wireless signal beacon of a ground station associated with an airport.

8. The system of claim 1, wherein the receiving mobile device is a first receiving mobile device, and wherein the periodically transmitting the aircraft beacon is performed by a second receiving mobile device.

9. The system of claim 1, wherein the aircraft beacon is a first aircraft beacon, and wherein the operations further comprise outputting a second aircraft beacon, after the outputting the first aircraft beacon, to cause the receiving mobile device to disable radio communications by the receiving mobile device on a selected radio frequency band.

10. The system of claim 1, wherein the operations further comprise at least one of: lowering a signal level of the selected radio frequency band or causing the selected radio frequency band to be muted by a network node to disable the selected radio frequency band on which the receiving mobile device is able to communicate.

11. The system of claim 10, wherein the operations further comprise causing the network node to initiate a handoff of the receiving mobile device to a different frequency band other than the selected radio frequency band.

12. The system of claim 1, wherein the operations further comprise sensing motion indicative of the aircraft taxiing, taking off, approaching landing, or landing, and transmitting the aircraft beacon based on the sensing of the motion.

13. A method, comprising:

receiving, by a mobile device associated with an aircraft passenger of an aircraft operating in proximity to the aircraft, an aircraft beacon transmitted periodically according to a retransmission period;

disabling, by the mobile device, communications of the mobile device in a predetermined frequency band, thereby limiting interference by the mobile device with aircraft altimeters of the aircraft, wherein the disabling communications of the mobile device is responsive to the receiving the aircraft beacon; and continuing to disable the predetermined frequency band until exceeding the retransmission period of receiving the aircraft beacon to prevent inadvertent transmission by the mobile device in the predetermined frequency band, thereby creating interference by the mobile device with aircraft altimeters of the aircraft.

14. The method of claim 13, further comprising receiving a continuously transmitted signal, and wherein the disabling the communications of the mobile device in the predetermined frequency band occurs in response to the receiving of the continuously transmitted signal.

15. The method of claim 13, further comprising detecting motion indicative of the mobile device being on an aircraft, and wherein the disabling occurs in response to the detecting.

16. The method of claim 13, wherein disabling the communications of the mobile device in the predetermined frequency band comprises entering the mobile device into an airplane mode of operation.

17. The method of claim 13, wherein the communications of the mobile device are first communications of a first mobile device, and further comprising outputting a communication to a second mobile device instructing the second mobile device to disable second communications of the second mobile device in the predetermined frequency band.

18. A non-transitory machine-readable medium, comprising executable instructions that, when executed by a processor of a device, facilitate performance of operations, the operations comprising:

determining that a mobile device is not to communicate in a frequency band, wherein the mobile device is operating in proximity to an aircraft and is associated with an aircraft passenger of the aircraft, to thereby limit interference with aircraft radio altimeters of the aircraft due to communicating by the mobile device in the frequency band; and transmitting an aircraft beacon periodically according to a retransmission period, wherein the transmitting the aircraft beacon is responsive to the determining that the mobile device is not to communicate in the frequency band, disabling communications of the mobile device in the frequency band, thereby limiting interference by the mobile device with the aircraft radio altimeters, and continuing to disable the frequency band until exceeding the retransmission period of receiving the aircraft beacon to prevent inadvertent transmission by the mobile device in the frequency band, thereby creating interference by the mobile device with aircraft altimeters of the aircraft.

19. The non-transitory machine-readable medium of claim 18, further comprising outputting a disabling signal.

20. The non-transitory machine-readable medium of claim 18, further comprising reducing a signal level of the frequency band at a base station via which the mobile device is capable of communicating.

* * * * *